Sept. 13, 1927.  
G. J. MEAD  
1,642,551  
APPARATUS FOR APPLYING DUST  
Filed March 8, 1922  
3 Sheets-Sheet 1

GEORGE J. MEAD
INVENTOR

BY Hadley F. Freeman
ATTORNEY

Sept. 13, 1927.
G. J. MEAD
1,642,551
APPARATUS FOR APPLYING DUST
Filed March 8, 1922
3 Sheets-Sheet 3
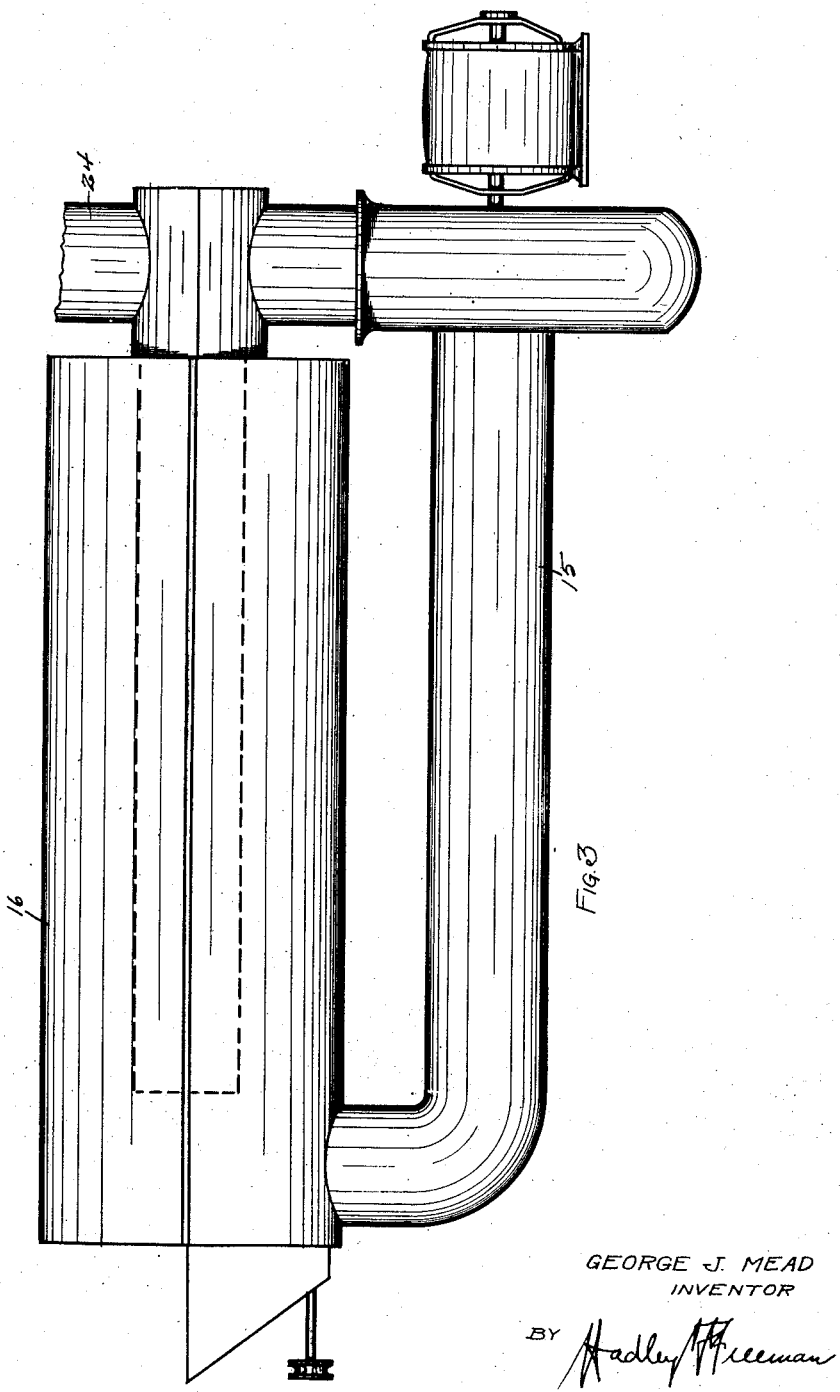
GEORGE J. MEAD
INVENTOR
ATTORNEY Patented Sept. 13, 1927.

1,642,551

UNITED STATES PATENT OFFICE.

GEORGE J. MEAD, OF CHICAGO, ILLINOIS, ASSIGNOR TO THE FISK RUBBER COMPANY, OF CHICOPEE FALLS, MASSACHUSETTS, A CORPORATION OF MASSACHUSETTS.

APPARATUS FOR APPLYING DUST.

Application filed March 8, 1922. Serial No. 542,159.

Sheet rubber articles, such as packing and matting, are usually packed in rolls and it is convenient to roll such articles as they come from the press and while they are still hot. In such case it is necessary to interpose between adjacent layers of the article something to prevent adhesion. A sheet of non-adhering material, such as duck or holland, satisfactorily prevents the adhesion but is costly and therefore impossible except perhaps for articles of very high value. A coating of non-adhering material, such as talc or soapstone, also satisfactorily prevents the adhesion and is inexpensive but unfortunately such materials fly into the air and permeate the surrounding atmosphere and thus injure both the workers and any raw materials nearby. To obviate the injury to the raw materials and to limit the number of workmen affected it is not uncommon to roll the article at the press with a liner of duck or holland and then remove the roll to a soapstoning room where it is rerolled to remove the liner and substitute a coating of soapstone or talc. With this arrangement, however, the fewer workers are affected to a much greater extent, the liner transmits soapstone wherever it is carried, and the cost of the liner is appreciable.

My invention provides apparatus for dusting articles and contemplates dusting articles other than those of rubber. In the case of rubber articles it contemplates dusting articles of various shapes and lengths and particularly in the case of sheet articles it contemplates dusting both short articles such as mats and continuous articles such as matting. It also contemplates dusting rubber articles either as they come from the press or as they are repacked to eliminate the liner. For purposes of illustration I disclose herein one embodiment which my invention may assume and for this disclosure I have selected an embodiment which is adapted to dust sheet articles generally and is particularly adapted to dust sheet rubber articles either as they come from the press or as they are repacked, particularly rerolled.

In the drawings accompanying this specification and forming a part thereof:—

Figure 2 is a general plan view thereof, while

Figure 3 is an end elevation of the dusting apparatus.

Figure 1:
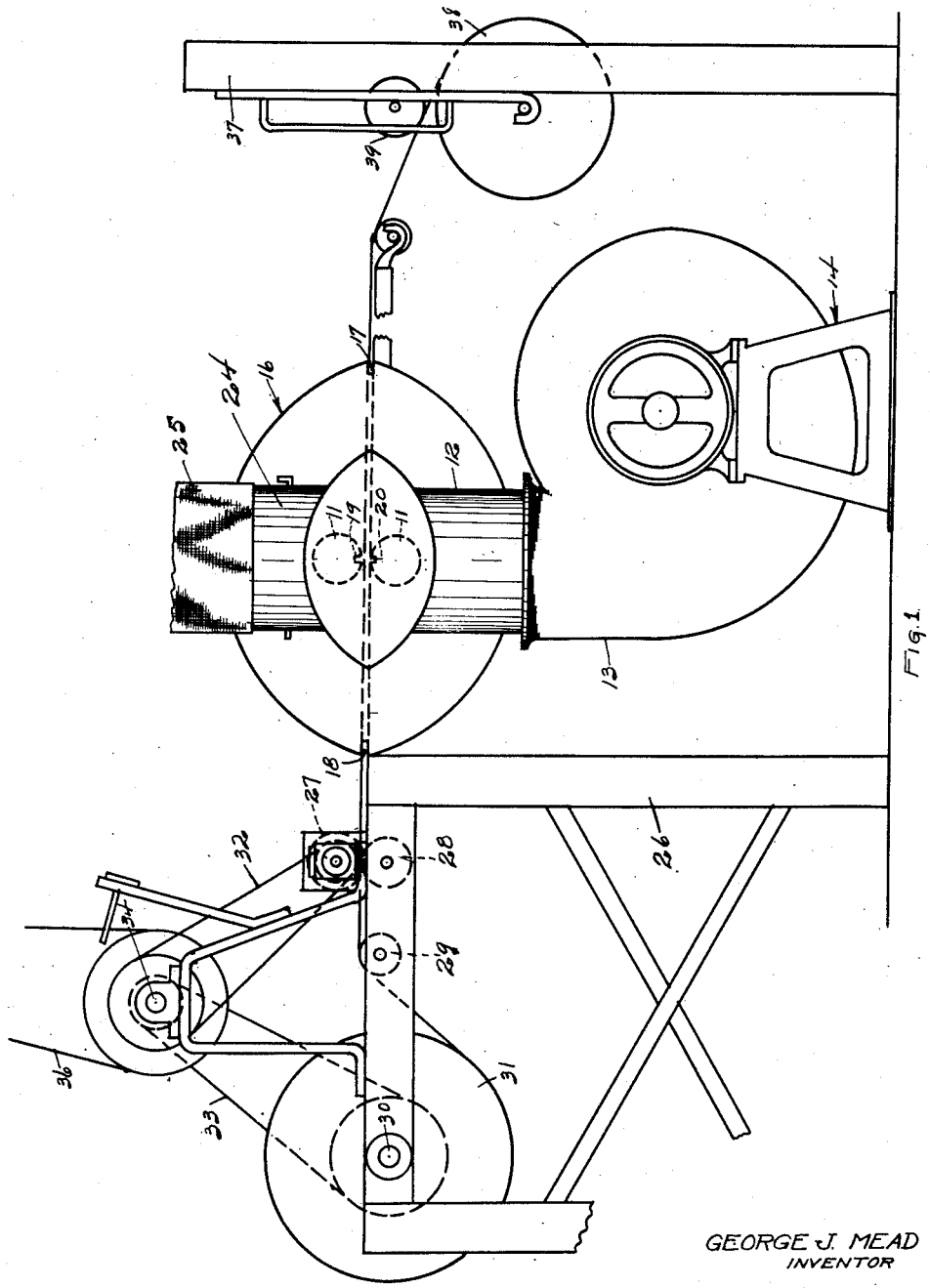
Figure 1 is a general side elevation of this illustrative embodiment.
Figure 2:
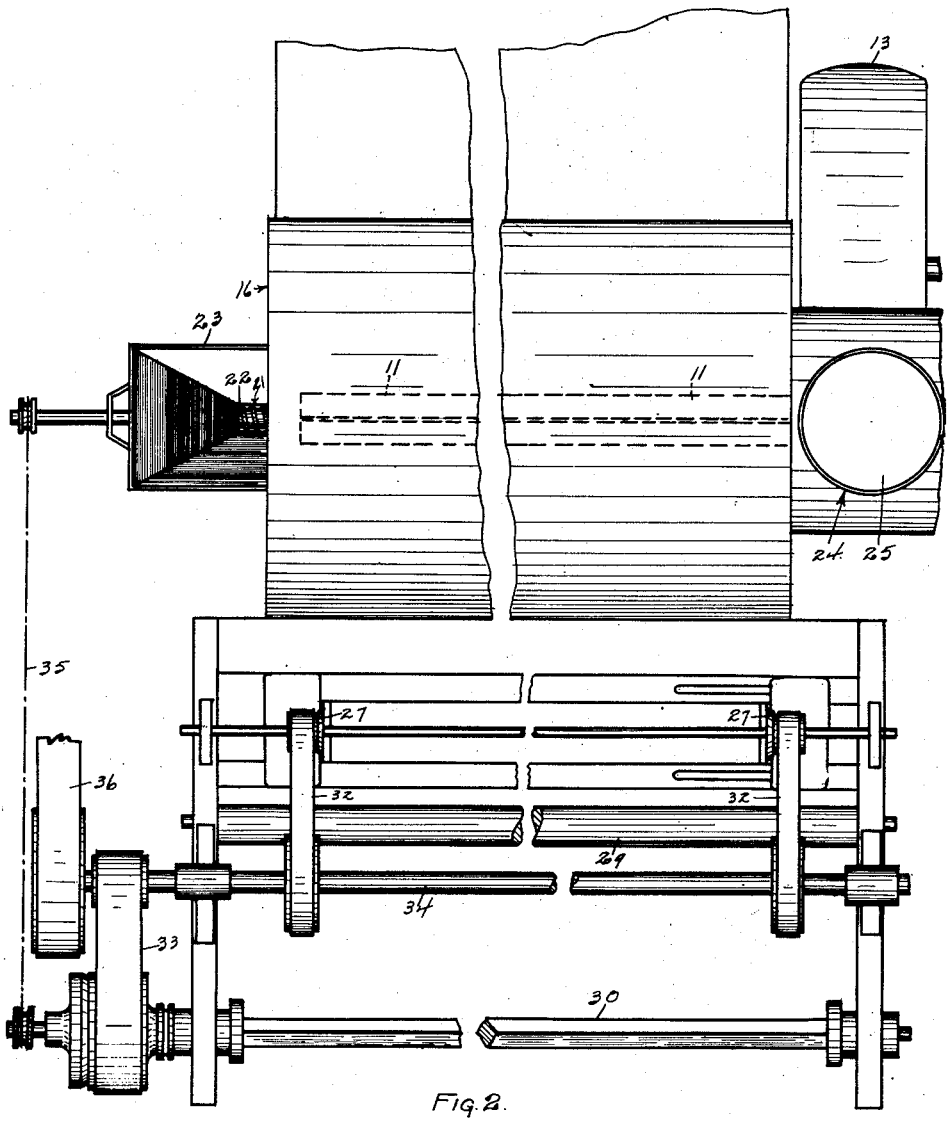

The dusting apparatus herein disclosed comprises a pair of tubes 11 closed at one end and opening at the other end into a chamber 12 connected to the delivery 13 of a blower 14 which draws its fluid through an intake 15 leading from the remote end of a chamber 16 which surrounds the tubes 11. Opening into the intake 15 is a tube 21 filled by a screw 22 which rotates at the bottom of a hopper 23 and feeds soapstone or other dust into the intake 15 to thus load the fluid with the dust. The chamber 16 is apertured at 17 and 18 to admit and discharge the articles which are to be dusted and the tubes 11 are spaced to permit the articles to pass therebetween and are apertured at 19 and 20 to permit the fluid in the tubes to flow out against the surface of the article passing through.

It will be understood from the above that there is a continuous circulation of fluid from the tubes 11 through the apertures 19 and 20 into the casing 16 and thence back through the intake 15, blower 14, and chamber 12 into the tubes 11, that this fluid is continually laden with the dust, and that it flows through the apertures 19 and 20 directly against the surface of the articles and thus effectively dusts these articles. It will also be observed that the restriction in the circulation of the fluid is at the apertures 19 and 20 so that the chamber 16 is clearly on the suction side of the blower 14 and contains fluid under less pressure than that without the chamber. Accordingly, at the openings 17 and 18 in the chamber 16 the pressure outside is greater than the pressure within and any flow of fluid through those openings will be from without the casing 16 to within the casing. As a result of this there is no flow of the dust laden fluid outwardly through the openings 17 and 18 and accordingly no dissemination of the dust through these openings.

The inflow of fluid through these openings 17 and 18, however, tends to increase the volume of fluid within the circulating system. To prevent such an increase, and to thereby maintain the inflow through the openings 17 and 18, a discharge is provided at 24 leading from the chamber 12 exteriorly of the circulating system. This discharge 24 is covered by a screen 25 which prevents passage of the dust and thus prevents dissemination of the dust through the discharge. Inasmuch as there are no other openings, dust dissemination is completely prevented.

The above described apparatus may be used with short length articles by feeding each article through the apparatus in any suitable manner as by providing a track for the article within the apparatus and feeding by hand or by passing the article through the apparatus on a suitable conveyor. The apparatus is, however, specially designed for use in dusting continuous sheet articles such as matting and in such case the article after once being threaded through the apparatus will continue to follow through. The embodiment herein illustrated, however, comprises means to draw such articles through the dusting apparatus and to roll such articles.

These means comprise a frame 26 positioned adjacent the discharge opening 18 of the chamber 16 and carrying a pair of rollers 27 and 28 between which the article is adapted to pass, an intermediate roller 29 adapted to support the article, and a shaft 30 adapted to receive and support a drum 31 on which the article may be rolled. The roller 27 and shaft 30 may be driven by belts 32 and 33 driven from a common drive shaft 34 which may also drive the dust feeding screw 22 as by means of a belt 35. The shaft 34 may itself be operated in any suitable manner as by a belt 36.

In utilizing the above apparatus the continuous article may be received directly from the press into the dusting apparatus in which case any desired means may be used to support the article between the press and the dusting apparatus. In other cases, however, and particularly with an intermittent press, it may be more convenient to roll the stock in a liner as it comes from the press and to then dust the stock as it is rerolled. The embodiment herein disclosed provides a stand 37 in advance of the dusting apparatus and adapted to support a roll 38 of liner and stock and a roll 39 adapted to receive the liner and to be frictionally driven from the roll 38 to automatically wind the liner as it is unwound from the roll 38.

It will be apparent from the above description that the embodiment herein disclosed is particularly adapted for the purposes for which it is designed and accomplishes the results desired. It is, however, but one embodiment of my invention and my invention is not limited to this embodiment or to the advantages herein set forth.

I claim:

1. A device of the character described comprising a chamber connected to the exhaust side of a blower, said chamber being provided with openings to admit and discharge an article, dust discharge means positioned within the chamber adjacent the path of travel of the articles and connected to the discharge side of the blower, a screened vent on the discharge side of the blower whereby suction is maintained at the openings in the chamber and means to supply dust to the chamber.

2. A device of the character described comprising a chamber connected to the exhaust side of a blower, said chamber being provided with openings to admit and discharge an article, tubes positioned within the chamber above and below the path of travel of the article through the chamber, each being provided with openings on the side adjacent said path of travel, said tubes being connected to the discharge side of the blower, a screened vent on the discharge side of the blower whereby suction is maintained at the openings in the chamber and means to supply dust to the chamber.

In testimony whereof I have signed my name to the above specification.

GEORGE J. MEAD.